United States Patent [19]

Lancaster et al.

[11] Patent Number: 4,728,566
[45] Date of Patent: Mar. 1, 1988

[54] HIGH-FREQUENCY LAMINATION OF POLYMER FOAMS

[75] Inventors: Gerald M. Lancaster, Surfside; Luis C. Mulford, Lake Jackson, both of Tex.

[73] Assignee: The Dow Chemical Company, Midland, Mich.

[21] Appl. No.: 54,454

[22] Filed: May 26, 1987

Related U.S. Application Data

[60] Division of Ser. No. 738,006, May 28, 1985, Pat. No. 4,671,992, which is a continuation-in-part of Ser. No. 645,990, Aug. 31, 1984, Pat. No. 4,601,948, which is a continuation-in-part of Ser. No. 531,110, Sep. 12, 1983, Pat. No. 4,600,614.

[51] Int. Cl.$^4$ .................. B32B 27/00; B32B 3/26

[52] U.S. Cl. .................. 428/286; 428/317.7; 428/500; 156/273

[58] Field of Search ............... 428/316.6, 318.4, 319.1, 428/319.7, 319.9, 317.3, 317.7, 286; 156/273

[56] References Cited

U.S. PATENT DOCUMENTS 4,612,249 9/1986 Packer .................. 428/500

Primary Examiner—Edith Buffalow
Attorney, Agent, or Firm—Walter J. Lee

[57] ABSTRACT

Olefin interpolymers having carbon monoxide polymerized as a comonomer therein are found to be useful as an HF-bondable layer between various substrates, including, e.g., a foam layer and a surface layer, whereby laminated foams are obtained.

11 Claims, No Drawings

HIGH-FREQUENCY LAMINATION OF POLYMER FOAMS

CROSS-REFERENCE TO RELATED APPLICATION

This is a divisional, of application Ser. No. 738,006, filed May 28, 1985 now U.S. Pat. No. 4,671,992, which is a continuation-in-part of co-pending Ser. No. 645,990 filed Aug. 31, 1984, U.S. Pat. No. 4,601,948 which is, itself, a continuation-in-part of copending application Ser. No. 531,110 filed Sept. 12, 1983 U.S. Pat. No. 4,600,614.

FIELD OF THE INVENTION

Laminated polymer foams, such as upholstery.

BACKGROUND OF THE INVENTION

The use of high-frequency electromagnetic energy as a means for heating polymers is an advancing art which finds application in many fields, especially in fields in which conventional conductive, convective, or radiant heat energy is either not suitable, not practical, or not possible. For instance, sealing of a polymer to itself or to some other substrate can be (if the composition of the polymer is appropriate) an important commercial technique in producing a desired end-product.

There are some polymers which are not suitable, or at least not well-suited, for high-frequency heating operations. In such ill-suited polymers high-frequency heating either does not occur, or if it occurs it does so only after inefficiently prolonged periods of treatment time. In production assembly lines, e.g., a quick heat-seal operation is generally preferred over a prolonged heat-seal operation.

Among the polymers which are ill-suited for high-frequency heating are olefin polymers, e.g., polymers and copolymers of ethylene, propylene, styrene or other α-olefinically unsaturated hydrocarbons having about 2 to about 10 carbon atoms. Some of these olefin polymers may contain polar groups, or polarizable groups, due to the incorporation therein of, e.g., acrylic (or methacrylic) acids or their alkyl esters as comonomers with the olefins, and these groups may, at high levels of incorporation tend to impart a modicum of high-frequency heatability to the polymer, but the efficacy is generally so slight that it is infeasible on a commercial basis. Some polymers having polar groups, e.g. chlorinated P.E., ethylene/vinyl acetate copolymer, PVC, polyvinylidene chloride, and polyamide, are heatable under the influence of certain frequencies of electromagnetic radiation, but are not generally well-suited for bonding using the higher frequencies.

Polyethylene is particularly known in the art to be substantially unsuitable for high-frequency heating unless sensitizers are added to the polymer; this is true regardless of whether it is linear or branched, or of whether it is low, medium, or high density (see, e.g., U.S. Pat. Nos. 3,336,173; 3,640,913; and 3,810,799).

It is an object of the present invention to provide a bonding film which has high-frequency heatability in order to bond a surface layer of material to a polymer foam substrate by the use of high frequency electromagnetic radiation.

SUMMARY OF THE INVENTION

Surface materials are laminated to a polymer foam substrate by employing a bonding film between said surface material and said polymer foam, said bonding film being HF-sealable. The bonding film is preferably a carbon monoxide-containing interpolymer.

DETAILED DESCRIPTIONS

The preparation of olefin polymers, copolymers, and terpolymers is well known and the methods and techniques are well known to practitioners of the relevant polymer art. For the most part, the olefin copolymers and terpolymers of interest in this present disclosure are prepared by the well known high pressure, high temperature, free-radical initiated, polymerization method such as the historically-popular ICI process or such as disclosed in U.S. Pat. No. 2,497,323. However, those polymerization processes which employ certain of the coordination catalysts or metal catalysts (e.g., the well-known Ziegler-type, Natta-type, or Phillips-type) may be used in selecting a catalyst (such as in U.S. Pat. No. 3,083,184) which is not easily poisoned or deactivated by carbon monoxide, or other oxygen-containing monomer, which is generally highly reactive with many metal-carbon bonds.

Olefin polymers within the purview of this invention, and which are rendered heatable (by high-frequency electromagnetic radiation) by incorporating carbon monoxide groups into the polymer chain, are polymers formed by polymerizing monomers having ethylenic (olefinic) unsaturation. A sole olefin or a plurality of olefins may be used along with the carbon monoxide in preparing the polymers. Preferably the olefin monomer is ethylene (sometimes including a small proportion of a $C_3$–$C_8$ aliphatic olefin for property modification). The olefin monomer can also include an unsaturated organic acid having 3 to 8 carbon atoms, such as acrylic acid, methacrylic acid, 1-butenoic acid, and the like; alkyl esters or metal salts of these acids may also be used, such as ethyl acrylate, methyl methacrylate, 2-ethyl hexyl acrylate, sodium acrylate, potassium methacrylate, and the like. Hydrogenated CO-containing olefin polymers (which creates H—C—OH groups along the polymer chain) are included here, such as hydrogenated ethylene/carbon monoxide copolymers. U.S. Pat. No. 2,495,292 discloses methods of hydrogenating such CO groups in a polymer chain.

It has been known for many years that olefins, e.g. ethylene, and carbon monoxide, can be copolymerized or terpolymerized.

The following listed patents are believed to be representative of the art pertaining to interpolymers of carbon monoxide and monoolefins: U.S. Pat. Nos. 2,495,292; 2,495,286; 2,497,323; 2,641,590; 3,083,184; 3,248,359; 3,530,109; 3,676,401; 3,689,460; 3,694,412; 3,780,140; 3,835,123; 3,929,727; 3,948,832; 3,948,873; 3,948,850; 3,968,082; 3,984,388; 4,024,104; 4,024,325; 4,024,326; 4,139,522; 4,143,096; and 4,304,887; and Canadian 471,169.

It is also known that there are additives (sensitizers) which can be blended into a polymer, e.g. polyethylene, to render it heatable by electromagnetic high-frequency energy, such as talc, $ZnCl_2$, carbon black, nylon, iron oxide, and others. Such additives, however, usually have a pronounced visual, physical, or chemical effect which, in some applications, is desirably avoided. Furthermore, when using additives as sensitizers one is faced with having to obtain a uniform distribution of the sensitizers in order to avoid "hot-spots" or arcing which can give irregular results and may even damage the polymer or other parts of the laminate.

It is within the purview of one aspect of the present inventive concept to create high-frequency sensitizer groups along the polymer chain in polymers which otherwise would be ill-suited for high-frequency heating. In this invention one does not encounter untoward visual effects in the polymer as a result of the sensitizer. Even in the present embodiments wherein a polymer of the present invention is blended with polymer (e.g., as a "masterbatch") in order to sensitize the whole, the polymers are generally compatible to an extent at which little or no visual effects are encountered. Thus, clear films of olefin polymers can be prepared, in accordance with the present invention, which are readily heat-sealed using high-frequency (HF) energy. It is especially of importance that the present invention provides polymers which are heatable by the action of microwave (MW) energy, a particular portion of the high-frequency energy range, thereby helping to fill a need in the industry where there is a sparsity of polymers which are suitable. The amount of CO groups in the ethylene interpolymers should be in the range of about 0.1 to about 50% by weight, preferably about 1 to about 40% by weight, most preferably about 5 to about 30% by weight.

As used herein "high-frequency sealability" refers to the bonding of the sealable polymer to a portion of itself or to another material using electromagnetic energy frequencies of 0.01–30,000 MHz. This includes radio-frequency (RF) heating and microwave (MW) heating in contradistinction to conventional heat sealing. The high-frequency range is generally taken to include electromagnetic waves over a broad frequency range (0.01 to 30,000 MHz) and covers the ultrasonic frequency range (18 KHz–1000 KHz), the radio frequency (RF) range (1 MHz–300 MHz), and the microwave (MW) frequency range (300 MHz–10,000 MHz). The RF and MW ranges are of particular interest here, with special interest in the MW range due to the increasing use of MW as a processing device.

Uses for this technology (polymer or blends) includes packaging applications were high speed and/or non-destructive seals are required, e.g., high-frequency activated adhesive films; extrusion coatings; moldings; hot melts in uses such as aseptic packaging, retort pouches, sandwich bags; lamination of foam, fabric, or film layers; powder moldings, and the like. Furthermore, the present invention provides polymers suitable for use in RF extruders, including continuous extruders or batch extruders. Wire and cable coatings can be applied in a continuous RF-extruder by the present invention.

In one aspect, this invention relates to an improved method of rendering a polymer which is not heatable or sealable utilizing high-frequency (0.1–30,000 MHz) electromagnetic radiation (HF) (e.g., polyethylene, polypropylene, polystyrene, etc.) HF-sealable by either incorporation of carbon monoxide by copolymerization or by blending or grafting a carbon monoxide copolymer or terpolymer into the polymer matrix. Hydrogenated forms of the above can also be used. In addition, ethylene/carbon monoxide copolymer (ECO) and interpolymers containing CO can be used for microwave sealing applications (i.e., microwave sealable plastic bags, toothpaste tube sealing, shampoo tube sealing, other microwave sealable containers, valve bag sealing, etc.). We have unexpectedly found that ECO copolymers and interpolymers convert high-frequency electromagnetic radiation into heat for sealing, welding or fusing over a broad frequency range (0.1–30,000 MHz). Typically, ethylene copolymers may be heatable to some extent at low RF frequencies of 1–50 MHz (radio frequency range is typically considered to be from 1–300 MHz; microwave frequency range is 300–30,000 MHz) such as ethylene/vinyl acetate copolymer (EVA), but none have been found which efficiently heat at the higher frequencies. Other examples of polymers heatable at low frequencies, but which do not efficiently heat at the higher frequencies are polyvinyl chloride (PVC), polyvinylidene chloride (PVDC), chlorinated polyethylene (CPE), and Nylon 6.

The advantages of sealing polymers with high-frequency electromagnetic waves include faster and more efficient sealing, sealing through poor heat-conductors, e.g., paper or cardboard exteriors, stronger seals or bonds, improved economics based on efficient use of energy input, the ability to seal, bond, or laminate larger surface areas, sealing of thicker or more complex film laminates and specific sealing.

The general heating rate for the interaction of an electromagnetic wave can be used to determine sealing rates utilizing the following equation:

$$G = 13.3 \times 10^{-14} fF^2(E' \tan \delta) \tag{1}$$

where G is the heating rate in cal/cm³.sec, f is the frequency in Hz of the electromagnetic wave, $F^2$ is the field strength or power in volts/cm, E' is the dielectric constant of the polymer and tan δ is the dielectric loss tangent (measure of the heating property of the material when exposed to HF electromagnetic waves). Thus, in general (since tan δ varies with frequency) the higher the frequency the higher the heating rate or the faster the sealing ability of the material. The carbon monoxide (CO) containing interpolymers can be sealed or heated over a broad frequency range which allows one to have the option of using microwave frequencies for optimum speed in heating or sealing. This feature (heating or sealing over such a broad frequency) appears to be unique to these interpolymers or copolymers containing CO.

There are also advantages of CO copolymers or interpolymers over other polymers (e.g., PVC, PVDC, CPE, EVA), that are sealable using radio frequency sealing methods which include, for example:

1. ECO is like conventional low density polyethylenes in physical properties and film appearance, i.e., higher melting point, low film blockage, easy processability, can be used for film, extrusion coating and molding resin. Furthermore, the need for plasticizers is obviated.
2. CO can be copolymerized with ethylene and vinyl acetate to produce a CO-modified EVA polymer to render it more sealable and broadens the sealing frequency range. CO can also be copolymerized into an EAA or EMAA polymer allowing an EAA-like or EMAA-like terpolymer to be RF and microwave sealable (EAA and EMAA are not RF or microwave sealable). This includes the metal salts or "ionomer-type" embodiments of these polymers.
3. CO containing polymers or interpolymers have higher dielectric constants than EVA copolymers, allowing higher field strengths to be used without the fear of arcing.

EXAMPLE 1

The following Table I shows the time required to melt a polymer in a microwave oven (Sears Microclassic microwave oven) at maximum power (brought 275 ml of water to boil in 2.48 minutes).

TABLE I

| Resin* | MI*** | Melt Time (sec)** |
|---|---|---|
| ECO | | |
| 10% CO | .1 | 37 |
| 10% CO | 10 | 35 |
| 5% AA; 10% CO | 10 | 75 |
| 5% AA; 10% CO | 3.5 | 85 |
| 5% AA; 5% CO | 3 | 90 |
| 1% CO | 1 | 90 |
| EVA (14% VA) | wax | >10 min |
| EAA (12% AA) | wax | >10 min |
| Oxidized (PE) | wax | >10 min |
| E/vinyl alcohol | — | 42 |
| EVA/CO (20% CO) | — | 25 |
| EVA | | |
| 28% VA | 3.5 | >10 min |
| 18% VA | 3.0 | >10 min |
| EVA | | |
| 20% AA | 300 | >10 min |
| 30% AA | 1250 | >10 min |
| HDPE (0.965 dens.) | .8 | >10 min |
| LDPE (0.918 dens.) | 6 | >10 min |
| LLDPE (0.918 dens.) | 6 | >10 min |
| Nylon ® -6 resin (dried) | — | >10 min |
| Saran ® B-2000 polymer | — | >10 min |
| Chlorinated P.E. (CPE) | — | >10 min |

*Samples were 2" (5.08 cm) diameter discs of 60 mil (1.5 mm) thickness, positioned on a non-RF sensitive polycarbonate sheet.
**If no melting was evident in 10 minutes, the test was stopped and reported as >10 min.
***MI is melt index in accordance with ASTM D-1238.
® Registered tradenames As can be seen from Table I, only ethylene/vinyl alcohol polymer and ethylene interpolymers containing carbon monoxide melted in the microwave oven (2450 MHz).

EXAMPLE 2

In order to determine the RF-sealability of carbon monoxide containing copolymers, a Callanan 1½ KW high-frequency electronic generator equipped with a 3/32"×12" (0.24×30.5 cm) brass sealing electrode and operating over a frequency range of 20–40 MHz (RF) was utilized in the following sealing experiment. Samples of 3-mil blown film of the copolymers shown in Table II were attempted to be sealed using the above RF sealer utilizing various dwell settings (sealing time) and power settings. The seals were examined and a seal was considered to have been made when the two sheets of material could not be separated at the seal point without tearing either piece of film. Table II also shows the improvement in minimum sealing time and resistance to arcing of CO containing copolymers in comparison to EVA copolymers.

TABLE II

| | RADIO FREQUENCY SEALABILITY | | |
|---|---|---|---|
| Resin | Power Setting | Dwell Time sec. | Sealability |
| EVA | 90 | 3 | No |
| (9.3% VA, 2 MI) | 100 | 3 | No |
| | 100 | 4 | Arc* |
| EVA | 10 | 1 | No |
| (18% VA, 2.5 MI) | 40 | 2 | No |
| | 70 | 2 | Yes |
| | 60 | 2 | Yes |
| | 70 | 1 | No |
| | 80 | 1 | Yes |
| | 90 | 2 | Arc |
| EVA | 60 | 2 | No |
| (12.0% VA, 2.5 MI) | 70 | 2 | No |
| | 80 | 2 | No |
| | 90 | 2 | Yes |
| | 100 | 1 | Arc |
| EVA | 30 | 2 | Yes |
| (25% VA, 2 MI) | 20 | 2 | No |
| | 60 | 1 | Yes |
| | 60 | .5 | No |
| | 70 | .5 | No |
| | 80 | .5 | Arc |
| EVA | 40 | 2 | Yes |
| (28% VA, 3.0 MI) | 20 | 1 | Yes |
| | 70 | .5 | Yes |
| | 80 | .25 | Arc |
| | 80 | .5 | Arc |
| ECO | 50 | 2 | No |
| (10% CO, 1 MI) | 60 | 2 | No |
| | 70 | 2 | Yes |
| | 100 | 1 | Yes |
| | 90 | 1 | Yes |
| | 80 | 1 | No |
| | 100 | .5 | Yes |
| | 90 | .5 | No |
| E/AA/CO | 70 | 2 | Yes |
| (5% AA, 10% CO, | 60 | 2 | Yes |
| 3.5 MI) | 50 | 2 | Yes |
| | 70 | 1 | Yes |
| | 60 | 1 | Yes |
| | 70 | .5 | Yes |
| | 60 | .5 | No |
| | 80 | .25 | No |
| | 90 | .25 | Yes |
| E/AA/CO | 70 | .5 | Yes |
| (5% AA, 10% CO, | 80 | .5 | Yes |
| 10 MI) | 80 | .25 | No |
| | 90 | .25 | Yes |

*Arc results in a hole burned through the film.

Within the purview of the present invention, useful articles are prepared which utilize the high-frequency electromagnetic radiation heatability and sealability of the above described CO containing olefin polymers. Layers or plies of these polymers are used as a means for sealing or bonding materials which are not, themselves, efficiently suitable for high-frequency electromagnetic radiation sealing or bonding. Various substrates, including particles, films, sheets, blocks, rods, spheres, and the like can be coated, at least in the area desired to be bonded, with these subject polymers and then sealed or bonded together using high-frequency electromagnetic radiation, especially those frequencies in the microwave range. These polymers, in the form of powders or particles, may be extruded into useful shapes, or as coatings onto other materials (e.g. wire and cable coatings), using high-frequency electromagnetic radiation as the heating means.

Novel adhesives comprising terpolymers of ethylene/carbon monoxide/carboxylic acid are prepared as embodiments in accordance with the present invention. The carboxylic acid moiety of the terpolymer may be any of the unsaturated carboxylic acid which are polymerizable through the double-bond, such as acrylic acid, methacrylic acid, crotonic acid, 1-butenoic acid, and the like, especially acrylic acid or methacrylic acid, most especially acrylic acid, including salts of these acids, such as metal salts, especially Na or K salts, commonly known as "ionomer" salts. The preparation of these E/CO/acid terpolymers may be done in the same manner as the E/acid copolymers as disclosed in U.S. Pat. Nos. 3,520,861 and 4,351,931. These patents disclose the use of a high pressure stirred autoclave reactor, using a free-radical initiator, to prepare uniform, random ethylene/carboxylic acid copolymers. Whereas these terpolymers can also be made by grafting techniques, by block polymerization techniques, in batch reactors, or in long tube reactors, it is preferred that the above disclosed stirring autoclave reactors be used whereby substantially uniform, random terpolymers are made.

Even though E/AA copolymers are generally regarded as having good adhesive properties with many substrates, as compared to polyethylene, there are some substrates where improved adhesion is desirable. Notable among these substrates, where improved adhesion is desirable, are polyamides (e.g. nylons), polyolefins (e.g. LDPE, HDPE, LLDPE, PP, OPP, polyisoprene), fluoropolymers (e.g. PTFE), polyethylene terephthalate (PET), metals (e.g. steel and aluminum foil), some paper-type products (e.g. glassine, kraft paper, etc.), cured epoxy resins, ethylene/vinyl alcohol copolymers, cured novolac resins, polyurethanes, polycarbonates, chloropolymers (e.g. polychloroprene, PVC, polyvinylidene chloride, and inorganic substrates (e.g. glass and porcelain).

Conversely, whereas ECO copolymers exhibit a modicum of heat-activated or heat-induced adhesive properties to some substrates, it has been determined that the present E/CO/acid terpolymers exhibit greater adhesiveness in such instances, especially to such substrates as SARAN polymer and polycarbonate (where ECO has some adhesiveness) and to ethylene/vinyl alcohol copolymers, nylon, and aluminum (where ECO exhibits little or no adhesiveness).

The adhesive properties of these E/CO/acid terpolymers may be utilized by any convenient method, such as by hot-melt application, by post-heating of the adhesive in-situ on the substrate, by application of the adhesive in a carrier, such as in a solvent or as a dispersion in an aqueous carrier or in a non-solvent. The adhesive may be used in joining substrates of similar or dissimilar materials. As mentioned hereinbefore, these terpolymers are also suitable for use as films or as other materials and have the beneficial property of being high-frequency heatable, especially at those frequencies which are in, or near, the microwave range.

These E/CO/acid terpolymers are quite similar in optics and physical properties to EAA copolymers made by the same process. Insofar as these novel adhesive terpolymers are concerned, the ranges of the comonomer ingredients are as follows:

| Monomer | Weight % of Terpolymer | | |
|---|---|---|---|
| | Operable | Preferred | Most Preferred |
| Ethylene | 20–98 | 40–98 | 60–96 |
| Carbon Monoxide | 1–40 | 1–30 | 2–20 |
| Carboxylic Acid | 1–40 | 1–30 | 2–20 |

The melt index (M.I.), also called melt flow rate, as measured in accordance with ASTM D-1238, is preferably in the range of about 0.5 to about 2500, most preferably in the range of about 1 to about 60, even more preferably in the range of about 1 to 20.

These E/CO/acid terpolymers are thermoplastic and can be thermoformed into films, sheets, tubes, or other articles. Powders of these terpolymers can be compression molded into sintered forms or the powders can be applied to the surface of a substrate where it can be heat-plastified to provide an adhesive layer or coating on the substrate or between two substrates. A film, strip, or sheet of these terpolymers can be placed between two substrates and heat-plastified to serve as an adhesive or laminate layer to hold the substrates together.

The following examples illustrate certain embodiments of the E/CO/acid terpolymers, compared with other polymers, but the invention is not limited to the specific embodiments shown.

EXAMPLE 3

The examples shown in Table III below are produced by compression molding at pressures and temperatures conducive to heat fusion. The resin samples to by tested for adhesion are first compression molded into 20 mil (0.51 mm) plaques and then laminated to the substrate (a film or plaque) to test for adhesion to the substrate. The adhesive of ethylene/carbon monoxide/acrylic acid terpolymers, E/CO/AA, is shown in comparision to low density polyethylene, LDPE; ethylene/acrylic acid copolymer; E/AA; ethylene/vinylacetate copolymer, E/VA; ethylene/carbon monoxide copolymer, E/CO; and ethylene/carbon monoxide/vinyl acetate terpolymer, E/CO/VA. The good adhesiveness obtainable with E/CO/AA terpolymers to the various substrates is evident, especially with nylon (a polyamide) and with polycarbonate which generally do not form strong bonds with most heat-plastified adhesives.

TABLE III

COMPRESSION MOLDED ADHESION VALUES (lbs/in)

| ADHESIVE | PERCENT COMONOMER WITH ETHYLENE | | | | SUBSTRATE | | | | | |
|---|---|---|---|---|---|---|---|---|---|---|
| | AA | CO | VA | MI | A[1] | B[2] | Nylon[3] | Aluminum[4] | EVAL[5] | Polycarbonate[6] |
| LDPE | — | — | — | — | .01 | .01 | .01 | .05 | .01 | .01 |
| E/AA Copolymer | 6.2 | — | — | 3.02 | .01 | .02 | 2.4 | 18.1 | .50 | .05 |
| E/AA Copolymer | 9.8 | — | — | 9.6 | .01 | .01 | 3.8 | 29.2 | .70 | .08 |
| E/AA Copolymer | 9.0 | — | — | 3.6 | .01 | .01 | 4.2 | 27.4 | .50 | .08 |
| E/VA Copolymer | — | — | 28.5 | 5.8 | 7.5 | 6.3 | 5.4 | 2.1 | 3.1 | .08 |
| E/VA Copolymer | — | — | 6.5 | 1.11 | .04 | .10 | 6.44 | 8.9 | 6.8 | .05 |
| E/CO/AA Terpolymer | 5.0 | 5.0 | — | 56.1 | >10.47 | >2.39 | 1.83 | 18.0 | 3.1 | 7.5 |
| E/CO/AA Terpolymer | 5.0 | 10.0 | — | 4.3 | 11.8 | >1.89 | 9.88 | 16.0 | 7.5 | >10.4 |
| E/CO/AA Terpolymer | 5.0 | 10.0 | — | 18.7 | 9.0 | >4.2 | >23.2 | 22.5 | 7.9 | >10.4 |
| E/CO Copolymer | 0 | 10.0 | — | 7 | 9.6 | >2.4 | .5 | .4 | .2 | >7.8 |
| E/CO Copolymer | 0 | 10.0 | — | 8.2 | 10.3 | >4.1 | .1 | .8 | .5 | >8.2 |
| E/CO/AA Terpolymer | 10.0 | 5.0 | — | 4.1 | 7.1 | 1.5 | >24.2 | 24.9 | 6.9 | DNR |

TABLE III-continued

| | COMPRESSION MOLDED ADHESION VALUES (lbs/in) | | | | | | | | | |
|---|---|---|---|---|---|---|---|---|---|---|
| | PERCENT COMONOMER WITH ETHYLENE | | | | SUBSTRATE | | | | | |
| ADHESIVE | AA | CO | VA | MI | A[1] | B[2] | Nylon[3] | Aluminum[4] | EVAL[5] | Polycarbonate[6] |
| E/CO/VA Terpolymer | — | 10.0 | 10.0 | 35.2 | 8.2 | 6.1 | 8.8 | 2.0 | 1.33 | DNR |

> indicates cohesive failure strength of film substrate
[1] 6-mil (0.15 mm) SARAN PVDC film
[2] 2-mil (0.051 mm) SARAN PVDC film
[3] Nylon-6 film
[4] Aluminum
[5] ethylene/vinyl alcohol copolymer, molded 20-mil (0.51 mm) plaque
[6] 2-mil (0.051 mm) polycarbonate cast film

EXAMPLE 4

In order to compare an ethylene/carbon monoxide copolymer (10% CO by weight, 18.7 M.I.) with an ethylene/carbon monoxide/acrylic acid terpolymer (10% CO and 5% AA by weight, 12.8 M.I.), a 2-mil (0.05 mm) thick coating of each is extrusion-coated onto various substrates and adhesion (lb./in.) is measured. In Table IV below, Sample A is the E/CO copolymer and is extrusion-coated at about 300° C.; Sample B is the E/CO/AA terpolymer and is extrusion-coated at about 290° C.; PVDC means polyvinylidene chloride; EVAL means ethylene/vinyl alcohol copolymer; LLDPE means linear low density polyethylene; LDPE means low density polyethylene; PET means polyethylene terephthalate; OPP means oriented polypropylene. (1 lb./in.=175 N/m)

TABLE IV

| SAMPLE | PVDC | PET | POLYAMIDE | OPP | ALUMINUM | LDPE | LLDPE |
|---|---|---|---|---|---|---|---|
| A | >5* | 0.5 | 0.32 | <0.05 | 0.14 | 0.3 | 0.07 |
| B | >5* | 1.6 | 2.44 | 0.05 | 2.5 | 0.5 | 0.5 |

*All ">" samples resulted in film failure, not adhesive failure. The above illustrates the superior adhesiveness of E/CO/AA terpolymers as compared to E/CO copolymers.

EXAMPLE 5

The packaging industry utilizes a number of barrier resins, such as in Table V below, and the E/CO/acid terpolymers are found to make good adhesives for making laminates which contain one or more barrier layers.

TABLE V

| | Oxygen Barrier Resistance |
|---|---|
| Nominal Value* | Polymer |
| 0.03–0.30 | ethylene/vinyl alcohol copolymers; EVAL |
| 0.05–0.20 | polymers or copolymers based on vinyl chloride and/or vinylidene chloride monomers; SARAN polymers |
| 2 | polyvinyl chloride, PVC |
| 80 | plasticized PVC |
| 4 | PET, polyethylene terephthalate |
| 10 | nylon, polyamide |
| 125 | HDPE, high density polyethylene |

*cc of $O_2$ as measured by ASTM D-1434

EXAMPLE 6

It has been determined that E/CO/acid terpolymers are useful as heat-plastified adhesives between layers of similar plastics or resins, layers of dissimilar plastics or resins, and/or between layers of plastics or resins and completely different substrates, such as paper, cloth, metal, glass, vitreous material, wood, leather. These terpolymers are also useful as heat-plastified adhesives between layers of materials, neither layer being plastic or resin, such as the materials named immediately above.

Certain embodiments of this invention relate to fabric/foam laminated structures in which a dielectrically or radio frequency (RF) sealable polyolefin film is used as an adhesive film to laminate, e.g., a cloth fabric cover to a polyurethane flexible foam. A polyolefin film which has a dielectric loss index greater than 0.2 (e.g., ethylene/acrylic acid/carbon monoxide, ethylene/carbon monoxide, or ethylene/vinyl acetate interpolymers, etc.) is inserted between a polyurethane flexible foam and a cloth fabric cover. The entire composite structure is then simultaneously laminated and embossed using a dielectric or RF sealer. This invention and structure alleviates the need to utilize special dielectrically heatable polyurethane foam formulations which require special machines for their production, are more expensive, and have inferior properties due to the addition of the dielectrically heatable material (e.g., PVC powder, metal filings, polyesters, etc.) This invention also allows fabrics or other cover materials to be laminated to any type of polymeric foam (e.g., ETHAFOAM*, STYROFOAM*, latex foams, etc.) or polymer sheet (e.g., polyethylene, polypropylene, polyurethane, ABS, polycarbonate, etc.). The areas of utilization of this invention include automotive seating and door panels, laminating mattress covers to mattress foam, furniture upholstery, pillows, wall coverings, acoustic insulation, camera bags, video recorder cases, other padded or protective enclosures, and the like.

Currently, special additives (e.g., PVC, polyester, SARAN* polymer, metal filings, low molecular weight "doping agents", etc.), which impart dielectric heatability to the polyurethane flexible foam, are used in the foam formulation in order to obtain the advantages of dielectric lamination and embossing (i.e., speed, energy efficiency, non-destructive to the remainder of the foam, and simultaneously embossing). These special foam formulations require special processing equipment, and generally result in a foam which does not have optinum physical properties (i.e., the additive decreases the percent open cells, decreases the percent elongation, increases the "boardiness" of the foam, and decreases resistance to moisture and heat). In addition, the arc resistance of the foam produced must be carefully adjusted or controlled in order to provide a seal without burning through the laminate when varied thicknesses are made. One method of overcoming the need for special formulations has been through the utilization of a vinyl plastisol, which has been painted onto the urethane foam structure and is dried to "cure". This method is also expensive, requiring an added production step and a major amount of plastisol is required since urethane foams are open celled and act as a sponge. Due to the added cost, difficulties in production and increased number of production steps, the use of dielectric lamination and embossing has been restricted to specialty applications, such as automotive upholstery, which can tolerate the above disadvantages.

Our presently claimed invention pertains to the dielectric lamination of fabric to foam without any of the above disadvantages. In addition, the dielectrically sealable polyolefin film beneficially acts as a water barrier (i.e., efficiently seals the foam, preventing water absorption) unless a film is used which is porous enough to allow the foam laminate to "breathe". The invention is extremely versatile in that it allows laminates of any type fabric or other covering material to be laminated to any type of polymeric foam or sheet.

The following examples were made utilizing a commercially available Callanan 1.5 KW, Model 15 dielectric sealing unit operated at ~30 MHz. The unit is equipped with the standard electronic sealing press utilizing an electrode which results in a $\frac{1}{8}"\times12"$ (1"=2.54 cm) seal.

EXAMPLE 7

A $4"\times4"\times\frac{1}{2}"$ sheet of slabstock of polyurethane foam, a $4"\times4"\times0.0015"$ piece of blown film of an ethylene/acrylic acid/carbon monoxide (EAACO) interpolymer (5% by weight acrylic acid, 10% by weight carbon monoxide and a 6 melt index), and a $4"\times4"$ piece of polyester fabric were placed between the electrodes of the dielectric sealing unit. The sealer was set at 100% power, a 2-second lamination time, a 2-second hold time, and 60 psi clamp pressure. The composite was sealed utilizing the above settings and the resulting laminate had an interlayer bond strength greater than the tear strength of the foam. In other words, the bond failure was cohesive failure of the foam rather than adhesive failure at the bond.

EXAMPLE 7-A

Comparative Example

The same procedure was followed as detailed in example 7 except that the EAACO film was not used. After the sealing effort, no seal was observed between the foam and the fabric.

EXAMPLE 7-B

Comparative Example

The same procedure was followed as detailed in example 7 except the EAACO film was replaced with a film of ethylene/acrylic acid (EAA) interpolymer (9% by weight acrylic acid, 9 melt index). After the sealing effort, no seal was observed between the foam and the fabric.

EXAMPLE 7-C

Comparative Example

The same procedure was followed as detailed in example 7 except the EAACO film was replaced with a film of LDPE (low density polyethylene, 0.925 density, 2 melt index). After the sealing effort, no seal was observed between the foam and the fabric.

EXAMPLE 7-D

The same procedure was followed as detailed in example 7 except the EAACO film was replaced with a 3 mil thick film of ethylene/carbon monoxide interpolymer (ECO) (10% by weight carbon monoxide at a 1 melt index). After sealing, the laminate seal had an interlayer bond strength greater than the tear strength of the foam.

EXAMPLE 8

The same procedure was followed as detailed in example 7 except the EAACO film was replaced with a 3 mil thick film of ethylene/vinyl acetate interpolymer (EVA) (18% by weight vinyl acetate at a 3.5 melt index). After sealing, the laminate seal had an interlayer bond strength less than the tear strength of the foam, but had sufficient adhesion to laminate the fabric to the foam.

EXAMPLE 9

The same procedure was followed as detailed in example 7 except the urethane foam was replaced with a $4"\times4"\times\frac{1}{4}"$ piece of ETHAFOAM* polymer (a polyethylene foam available from The Dow Chemical Company) and the EAACO film was replaced with a film of ECO copolymer. The lamination time was 4 seconds and hold time was 6 seconds. After sealing, the laminate had an interlayer bond strength greater than the tear strength of the foam.

The main distinguishing component of our presently claimed invention is the dielectrically sealable polyolefin film. The film must not only be dielectrically sealable, but also should have adhesion to the desired substrates (i.e., fabric or coating, and the foam). The ability of a polymer to undergo dielectric heating, or to accept high frequency energy is perhaps best explained by the previously described equation.

E' tan δ is called the loss index and is a relative measure of the polymer's ease of heating. In general, the following table ranks the ease of heating of a polymer utilizing high frequency electromagnetic radiation.

| Loss Index | Heatability |
|---|---|
| ≧.2 | Excellent |
| .07–.2 | Good |
| .01–.07 | Poor |
| ≦.01 | No Response |

The lower the loss index of a polymer, the higher must be the voltage and/or frequency (note that the loss index is an unpredictable function of frequency) in order to obtain the required heating rate. Thus, one wishes to use the polymer with the highest loss index possible which has the necessary adhesion and strength characteristics required for the desired lamination. The following table presents the loss indices of polyolefins which are felt to be part of this invention (i.e., all polyolefin films which have a loss index greater than 0.01) as well as comparative examples.

| Polymer | Dielectric Loss Index |
|---|---|
| ECO$^2$ - 10% CO | .074 |
| ECO$^2$ - 5% CO | .041 |

-continued

| Polymer | Dielectric Loss Index |
| --- | --- |
| ECO - 22% CO | .28 |
| EAACO[3] - 5% AA, 5% CO | .054 |
| EAACO - 5% AA, 10% CO | .087 |
| EVA[4] - 7.5% VA | .030 |
| EVA - 28% VA | .16 |
| EVACO[5] - Elvaloy 741 | .39 |
| EAA[6] - 10% AA | .0036 |
| EAA - about 20% | .0059 |
| LDPE[7] | .0008 |

[1] Measured utilizing ASTM D1531 at 1 MHz at 20° C.
[2] Ethylene/carbon monoxide
[3] Ethylene/acrylic acid/carbon monoxide
[4] Ethylene/vinyl acetate
[5] Ethylene/vinyl acetate/carbon monoxide
[6] Ethylene/acrylic acid
[7] Low density polyethylene (LDPE)

With respect to the presently claimed invention the dielectric loss index of the polymer film should be greater than 0.01 and preferably greater than 0.08. The required film thickness will be dependent on the type and characteristics of the materials to be laminated and empossed. The typical film thickness will range between 1.5 mils and 9 mils. The frequency of the dielectric sealer should range from 0.1 to 300 MHz and preferably should range from 10 to 100 MHz. Microwave sealing is also possible, and sometimes preferred, utilizing frequencies from 300 to 10,000 MHz.

Other polymeric films (not restricted to polyolefins) which have a dielectric loss index greater than 0.01 are, e.g., nylon and SARAN* polymer, chlorinated P.E., polyesters, metal filled polymeric films, carbon black filled polymers, and the like.

Films of blends of high dielectric loss index polymers with low loss index polymers are also operable if the loss index of the blend is greater than 0.01. Polymer films to which an inorganic filler, which modifies the dielectric loss index of the composite, has been added and blended with a high dielectric loss polymer are also operable.

Currently, the automotive industry utilizes dielectric lamination techniques for the fabrication of seat covers and door side panels. The technology for the utilization of this invention is available for the above application. Thus, the invention can be utilized by the automotive industry with the current lamination and embossing technology.

The utilities of this presently claimed invention include: the lamination of porous articles, e.g. non-woven fibers, to foam for use in textiles and the like; lamination of fabric and/or plastic sheeting to foam for use in upholstery applications and the like; laminating a water barrier film or surface layer to foam in order to make water resistant furniture or other articles or to act as a water barrier for foam products, e.g., foam insulation; and the lamination of two types or pieces of fabric together for use in textiles or similar articles.

The dielectrically sealable polymer film is inserted between the foam and the fabric covering or other covering, or can be prelaminated or extrusion coated to either the covering or the foam before the total structure is dielectrically laminated and embossed.

We claim:

1. A composite article comprising a polymer foam having HF-bonded thereto at least one surface layer, wherein the HF-bonding is effected by a layer of HF-bondable polymer film between said foam and said surface layer, said HF-bondable polymer film comprising a carbon monoxide-containing olefin interpolymer having a dielectric loss index of about 0.01 or greater, said polymer foam being selected from the group consisting of foamed olefin polymers, polystyrene foam, polycarbonate foam, latex foam, rubber foam, foamed ABS polymer, foamed PVC, formed PVDC, foamed acrylates, foamed methacrylates, foamed styrenic/olefinic copolymers, and foamed polymer blends.

2. The article of claim 1 wherein the surface layer is selected from the group comprising polymers, fabrics, leather, cellulosic products, wood, vitreous material, metal foils, paper, and foams.

3. The article of claim 1 wherein the HF-bondable polymer film comprises a carbon monoxide-containing olefin interpolymer having a dielectric loss index of 0.02 or greater alloyed, blended, or otherwise admixed with a heat-plastifiable polymer having a dielectric loss index of less than 0.01 in an amount such that the combination has a dielectric loss index of 0.01 or greater.

4. The article of claim 1 wherein the HF-bondable polymer film comprises at least one of ECO, ECOAA, ECOMAA, and ECOVA.

5. The article of claim 1 wherein the HF-bondable polymer film is bondable at MW-frequencies.

6. A method of making laminated foam article, said method comprising placing a layer of HF-bondable polymer film between a polymer foam layer, other than polyurethane foam, and a surface layer, holding the layers closely together, and subjecting the layers to HF frequency radiation, in the area where bonding is desired, for a time sufficient to melt or heat-plastify the HF-bondable polymer film, after which time the layers are cooled, thereby effecting bonding, wherein the HF-bondable polymer film comprises a carbon monoxide-containing olefin interpolymer.

7. The method of claim 6 wherein the polymer foam is at least one selected from the group comprising foamed olefin polymers, polystyrene foam, epoxy foam, polycarbonate foam, latex foam, foamed rubber, foamed ABS polymer, foamed PVC, foamed PVDC, foamed acrylates, foamed methacrylates, foamed styrenic/olefinic copolymers, and foamed polymer blends.

8. A method of claim 6 wherein the surface layer is selected from the group comprising polymers, fabrics, leather, cellulosic products, wood, metal foils, paper, and polymer foams.

9. The method of claim 6 wherein the HF-bondable polymer film comprises a carbon monoxide-containing olefin interpolymer having a dielectric loss index of 0.02 or greater alloyed, blended, or otherwise admixed with a heat-plastifiable polymer having a dielectric loss index of less than 0.01 in an amount such that the combination has a dielectric loss index of 0.01 or greater.

10. The method of claim 6 wherein the HF-bondable polymer film comprises at least one of ECO, ECOAA, ECOMAA and, ECOVA.

11. A laminated structure made in accordance with claim 6.

* * * * *

UNITED STATES PATENT AND TRADEMARK OFFICE
CERTIFICATE OF CORRECTION

PATENT NO. : 4,728,566
DATED : March 1, 1988
INVENTOR(S) : Gerald M. Lancaster & Luis C. Mulford It is certified that error appears in the above-identified patent and that said Letters Patent is hereby corrected as shown below:

Col. 2, line 18, "in" should be --by--.

Col. 3, line 43, "were" should be --where--.

Col. 4, line 65, "polymers" should be --copolymers--.

Col. 5, line 23 in Table I, "EVA" should be --EAA--.

Col. 8, line 16, insert --about-- after "to".

Col. 8, line 36, "by" should be --be--.

Col. 12 and 13 in the line with the second heading of "Dielectric Loss Index" it should read --Dielectric Loss Index$^1$--.

Col. 14, line 9, "formed" should read --foamed--.

Col. 14, line 30, insert --a-- after "making".

Signed and Sealed this

Thirteenth Day of December, 1988

*Attest:*

DONALD J. QUIGG

*Attesting Officer*   *Commissioner of Patents and Trademarks*